United States Patent
Hoose

(10) Patent No.: US 8,116,002 B2
(45) Date of Patent: Feb. 14, 2012

(54) GRATING DEVICE WITH ADJUSTING LAYER

(75) Inventor: John Hoose, Fairport, NY (US)

(73) Assignee: Lumella Inc., Fairport, NY (US)

( * ) Notice: Subject to any disclaimer, the term of this patent is extended or adjusted under 35 U.S.C. 154(b) by 645 days.

(21) Appl. No.: 12/199,582

(22) Filed: Aug. 27, 2008

(65) Prior Publication Data

US 2009/0059375 A1   Mar. 5, 2009

Related U.S. Application Data

(60) Provisional application No. 60/966,145, filed on Aug. 27, 2007.

(51) Int. Cl.
G02B 5/18 (2006.01)

(52) U.S. Cl. ......... 359/576; 359/571; 359/572; 359/350

(58) Field of Classification Search .......... 359/571–572, 359/576
See application file for complete search history.

(56) References Cited

U.S. PATENT DOCUMENTS

| | | |
|---|---|---|
| 4,313,648 A | 2/1982 | Yano et al. |
| 4,846,552 A | 7/1989 | Veldkamp et al. |
| 5,907,436 A | 5/1999 | Perry et al. |
| 6,754,006 B2 | 6/2004 | Barton et al. |
| 6,762,880 B2 | 7/2004 | Holm et al. |
| 6,839,173 B2 | 1/2005 | Shimmo et al. |
| 6,958,859 B2 | 10/2005 | Hoose et al. |
| 7,256,938 B2 | 8/2007 | Barton et al. |
| 2002/0024735 A1 | 2/2002 | Kleeman et al. |
| 2005/0052743 A1* | 3/2005 | Speckbacher et al. ........ 359/566 |
| 2005/0200957 A1 | 9/2005 | Hikichi et al. |
| 2006/0152809 A1* | 7/2006 | Smith .......................... 359/569 |
| 2007/0070276 A1 | 3/2007 | Tan et al. |

OTHER PUBLICATIONS

Falk et al., Seeing the Light: Optics in Nature, Photography, Color, Vision, and Holography, John Wiley & Sons 1986, p. 313.*

* cited by examiner

*Primary Examiner* — Stephone Allen
*Assistant Examiner* — Kimberly N Kakalec
(74) *Attorney, Agent, or Firm* — Wolfgang E. Stutius

(57) ABSTRACT

A reflection grating device with a continuous non-reflecting dielectric adjusting layer disposed between a grating structure and one or more continuous reflecting layers is disclosed that operates in an order of interest, such as the $1^{st}$ order or $3^{rd}$ order of diffraction, with high efficiency and near-exclusion of unwanted orders. Such devices can be employed, for example, in telecommunication and laser applications.

11 Claims, 16 Drawing Sheets

GRATING DEVICE WITH ADJUSTING LAYER

RELATED APPLICATIONS

This application claims the benefit of U.S. Provisional application No. 60/966,145 filed on Aug. 27, 2007.

BACKGROUND OF THE INVENTION

1. Field of the Invention

The invention relates generally to the field of optical telecommunication and laser diffraction. More specifically, embodiments of the invention relate to novel diffraction grating devices particularly suited for use in telecommunications and laser devices.

2. Background

Diffraction gratings are commonly used to separate the various channels in wavelength division multiplexing (and de-multiplexing) applications according to wavelength. As well, such gratings are used to create spectral filters in high energy laser applications also according to wavelength, each of such applications made possible through the use of free space diffraction grating designs known in the art. Presently, the performance of these diffraction gratings in their telecommunications setting is limited by high polarization dependent loss (PDL), low diffraction efficiency in certain desired orders of diffraction. While the problem represents less of a concern for transmission devices, the relevant industry faces a number of competing challenges to economically manufacture reflection devices while at the same time achieve high efficiencies in but one order of diffraction. In addition, in some applications such as telecommunication devices, the achievement of minimum polarization dependent loss (PDL) presents yet another challenge.

Excimer lasers operating at 193 nm and 248 nm (ultraviolet wavelengths) are increasingly used as light sources for mask exposure in semiconductor manufacturing to decrease the feature size of integrated circuits, as described in U.S. Pat. No. 6,958,859 B2 (J. Hoose et al). U.S. '859 describes grating devices exhibiting high diffraction efficiencies in low orders of diffraction, exemplified at the $2^{nd}$ order. In addition, lasers operating within the 700 nm to 900 nm range, such as titanium-sapphire pulse compression lasers, are actively employed in the research community. Unfortunately, $2^{nd}$ or lower order excimer laser devices are more difficult to manufacture. Notably, their groove structure spacing is impracticably narrow (i.e., high periodicity) by comparison to higher, visible wavelength devices, such that yield and repeatability in the manufacture of low order excimer laser devices is commercially questionable. By comparison, when such laser devices are designed for higher orders, e.g. $3^{rd}$ and higher orders, the groove spacing of their grating structures can be more efficiently manufactured, which follows from the application of known design algorithms (i.e., Maxwell's equations) to the manufacturing process to yield gratings with longer periods required for diffraction into the desired higher order.

Higher order reflection devices, however, can produce multiple orders of diffraction in addition to their design order of interest, sapping energy from the latter. Such effects have been reported in U.S. '859 for $4^{th}$ order devices.

Undesirable energy dissipation into unwanted orders is not unique to laser applications. For example, in $1^{st}$ order reflection devices, operating at telecommunications wavelengths in the range from about 1400 to about 1650 nm dissipation is problematic, as well. In particular, energy can divert into the $0^{th}$ order, the non-diffracted portion of incident light. In such devices, moreover, the energy diversion in the diffracted order can be unequal in two planes of polarization of incident light, $T_M$ and $T_E$, such that PDL in those devices becomes undesirably high. U.S. Pat. No. 6,762,880 B2 (Johan Christer Holm et al) discloses these concerns particularly for transmission devices operating in chosen or desired diffraction orders.

It would therefore be desirable to provide an easily manufacturable reflection grating device that has high diffraction efficiency into single orders of interest, in particular for UV laser applications and for telecom applications.

SUMMARY

An object of the present invention is to provide flexible design and manufacturing for telecommunication and laser reflection grating devices.

Another object of the present invention is to provide reflection devices that can be optimized to diffract substantially all of the incident light energy into single orders of interest, and, for telecommunication devices, with minimum PDL.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, a highly efficient reflection grating device is provided for use in telecommunication and/or laser systems. The device comprises, in sequence, a grating structure, either discontinuous or continuous in geometry, a continuous non-reflecting dielectric adjusting layer, and one or more continuous reflection layers. The grating structure is selected for use with a predetermined incident radiation wavelength of interest at an angle of incidence that normally propagates light into multiple orders of diffraction. In sequence after the grating structure lies a continuous non-reflecting adjusting layer followed by one or more continuous reflecting layers. In accordance with the invention, the adjusting layer and the grating structure can be optimized to suppress substantially all but one propagated order of interest resulting in high efficiency in the order of interest.

In some embodiments, the performance of reflection devices is predicted to suppress substantially all but 3rd orders (laser applications), as a result of optimizing the adjusting layer and grating structure into that order. Such devices are well suited for incident radiation in the ultraviolet region, for example at excimer laser wavelengths of 193 nm and 248 nm. In yet other laser embodiments, devices so optimized and operating in the $1^{st}$, 2nd or $3^{rd}$ order as the order of interest at wavelengths in the range from about 700 nm to about 900 nm can also be used and are expected to achieve similarly high efficiency in the desired order.

In other embodiments, the adjusting layer and grating structure are optimized for highly efficiency operation in the $1^{st}$ order of interest, while substantially all other orders including the $0^{th}$ order are suppressed. Such $1^{st}$ order devices are typically suited to the telecommunications field at wavelengths of interest, for example within a range from about 1400 nm to about 1650 nm. In further $1^{st}$ order embodiments, optimization of the grating structure and the adjusting layer can achieve low polarization loss, an important attribute in the telecommunications applications where signal information in both $T_M$ and $T_E$ should not be lost or diminished.

In practicing the invention, a continuous non-reflecting dielectric adjusting layer is introduced to provide latitude in the design of reflection grating devices. In particular, when the adjusting layer and the grating structure are optimized to maxima of efficiency in the desired order, the reflection grating devices focus energy into an order of interest to the near-exclusion of other orders. Techniques reported for achieving diffraction into various or single orders of diffraction by optimizing the design of the grating structure, such as in U.S. '880 or '859 mentioned above, are useful in the design of the adjusting layers herein. Such optimization, or predictive, techniques—as applied to determine grating structure parameters—implement the vector formalism of electromagnetic theory (i.e., Maxwell's equations), and have been commercialized in the form of software products such as GSolver™ available from Grating Solver Development Company, Allen, Tex. for grating structures. It is not believed, however, that such optimization models and techniques have been employed to concurrently optimize both grating structures and continuous non-reflecting dielectric adjusting layers as described herein. By providing reflection devices with a continuous non-reflecting dielectric adjusting layer, the optimization is enabled. And, by carrying out such optimization of both the grating and the adjusting layer, efficiencies in the desired order of interest can be maximized to the near-exclusion of unwanted orders.

In the algorithms and techniques employed to run out the optimization of the grating and the adjusting layer, various parameters are permuted numerous times and the results compiled. At the end of the exercise, energy maxima in the desired order for each permutation is reported until efficiencies are high enough to be commercially attractive, and in most instances better than devices that are optimized solely by the manipulation of grating structure parameters.

Typical numeric parameters for optimizing the adjusting layer include index of refraction, dielectric materials used, and physical thickness. Grating structure parameters, on the other hand, additionally include grating geometry such as grating period, depth of groups, width of grooves, complexity of the groove structure, such as multi-layered, multi-index grooves versus homogenous groove structures, to name a few.

In some embodiments, the physical thickness of the adjusting layer is substantially unequal to that of a reference ½ wavelength layer. In particular, the physical thickness of such reference layer, depending on its index of refraction and the angle of incident radiation, corresponds to an optical thickness of ½ the wavelength of the incident radiation. In the discussion following, mention of the ½ wavelength reference layer will signify the physical thickness of such a layer as defined in the preceding sentence.

The index of refraction of the successive elements of the device is typically chosen so that adjacent layers have alternating high and low indices such as described in U.S. Pat. No. 5,907,436 (Michael D. Perry et al). The alternating indices apply from top to bottom, starting with the grating structure itself, and sublayers or portions thereof, continuing on to the adjusting layer and thereafter to the one or more reflection layers. The indices of refraction of adjacent such layers throughout the device should differ by more than 0.1. As noted above, the adjusting layer is non-reflecting, i.e. transparent to incident radiation, and therefore does not provide mirror-like reflection in contrast to the adjacent reflecting layer or layers of the grating device.

The specific configuration and geometry of the grating structures, moreover, that can be employed in embodiments, can be continuous with the grating structure forming a surface of an otherwise continuous layer stacked on a surface of the adjusting layer opposite to the surface facing the reflection layer, or layers. Such continuous grating structures are formed by various ruled or holographic methods to form patterns followed by partial etching to achieve the desired results on a continuous portion of the grating structure. Alternatively, full etching to produce a discontinuous structure overlying the adjusting layer can be used. Other methods of forming a discontinuous grating structure can also be used.

Suitable grating structures, moreover, can include stratified "bumps" comprising dual or multiple dielectric layers of different materials, each alternating with respect to the adjacent material from high to low in index of diffraction. In several embodiments, multi-layered grating structures achieve particularly good performance.

The last layer, or layers, in succession after the grating structure and adjusting layer, can comprise single or multiple reflecting layers designed to provide reflection of the incident radiation. Multiple layers of such dielectric materials, referred to as "stacks", typically comprise layers with alternating high-low indices of refraction with respect to successive layers and, in some embodiments, pairs of successive layers also have physical thicknesses that are substantially equal to the physical thickness of a ½ wavelength reference layer as above described.

BRIEF DESCRIPTION OF THE DRAWINGS

The foregoing and other objects, features, and advantages will be apparent from the following more particular description of the embodiments of the invention, as illustrated in the accompanying drawings.

The elements of the drawings are not necessarily to scale relative to each other.

DETAILED DESCRIPTION OF THE INVENTION

Figure 1:
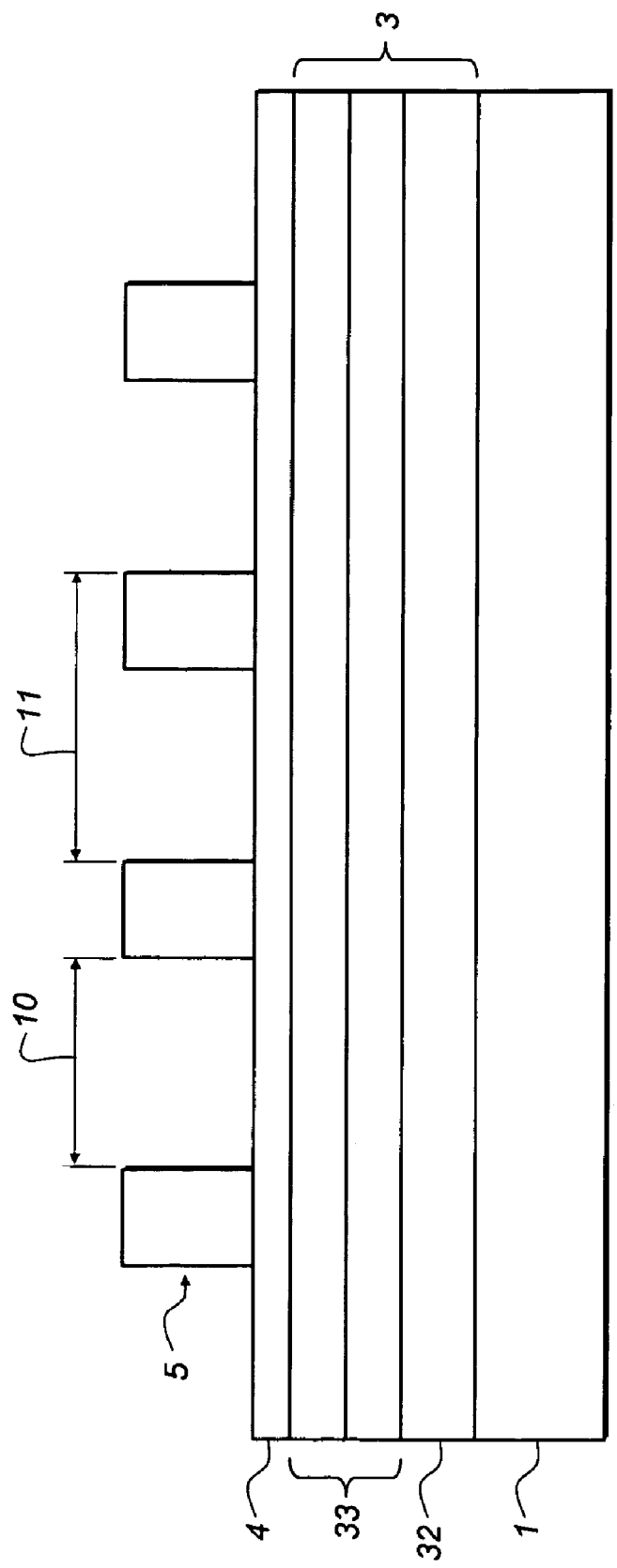
FIG. 1 shows an embodiment in which an etched grating structure overlies an adjusting layer overlying a high/low index reflection multilayer.

The following is a detailed description of the preferred embodiments of the invention, reference being made to the drawings.

The invention relates to a high efficiency reflection grating device comprising three components commencing with a dielectric grating structure selected for use with an incident radiation wavelength of interest, λ, followed in sequence by, a continuous, non-reflecting dielectric adjusting layer and thereafter one or more reflecting layers. The description of these components follows below. Notably, the sandwiching of the adjusting layer between the grating structure and the reflecting layer or layers provides a reflection grating device whose efficiency in the desired order is desirably quite high when optimization techniques are applied to both the adjusting layer and the grating structure. As a result of this novel configuration, reflection grating devices can be designed that exhibit high efficiency, for example an efficiency of at least 90% or 95% and higher in a desired order of interest thus evidencing the suppression, or near-exclusion, of unwanted orders.

At an incident angle, θ, from the grating surface normal, incident radiation will normally disperse into multiple diffraction orders, namely, the $0^{th}$, $1^{st}$, $2^{nd}$, $3^{rd}$, $4^{th}$ order and so on. For a given grating period, d, greater dispersion is achieved at the higher of these orders which is desirable when operating at low wavelengths, such as excimer wavelengths of 193 nm or 248 nm. As noted earlier, the other orders that are normally propagated tend to divert energy from the order of interest, thus potentially decreasing the efficiency of the device in the order of interest. The devices described herein can be optimized to diminish such diversion when they include a continuous non-reflecting dielectric adjusting layer sandwiched between the grating structure and one or more continuous layers designed for reflection. As noted above when the parameters of the grating structure and adjusting layer are optimized by the Maxwell derived computation techniques, substantially all of the unwanted orders can be suppressed, resulting in very high efficiency in the desired order.

Typically, but not always, the physical thickness of the adjusting layer is substantially unequal to the physical thickness of a ½ wavelength reference layer, as described above. In certain laser 3rd order devices, the adjusting layer thickness predicts to about 30% of the reference layer physical thickness. In certain telecommunication 1st order devices, on the other hand, the adjusting layer is predicted to about 50% of the reference. In each instance, the results depend somewhat on other assumed operating conditions, materials and configuration parameters.

In the following descriptions of diffraction grating structures, the adjusting layer, and the reflecting layer, dielectric materials may mean any of the many oxides, such as but not limited to, aluminum oxide, silicon dioxide, hafnium dioxide, titanium dioxide, and fluorides such as but not limited to lithium fluoride, aluminum fluoride, magnesium fluoride, and lanthanum fluoride. While in the below examples $SiO_2$ and $Al_2O_3$ are illustrated for the grating structure, adjusting layer and reflecting layer/layers, such materials are representative only and other materials could be substituted. For example, oxides, nitrides, oxynitrides and fluorides of group II elements, such as Mg and Ca, group III elements, such as Al, and group IV elements, such as Si, Ge, Zr, and Hf, can be used, as long as they are transparent in the wavelength range of interest. In the case of the reflecting layer, such transparency is required when the material is dielectric. If a metal reflection layer is desired, the metals chosen, such as Cu, Al, Gold or Ag, are selected primarily for their reflectance.

When semiconductor grating structures are desired, suitable materials will include silicon or germanium, to name a few.

FIG. 1 illustrates a grating device embodiment comprising a diffraction grating structure, 5, comprising $SiO_2$, a relatively low index material of n=1.56, with a groove width, 10, of 0.031 microns, and height of 0.055 microns. The grating spacing, 11, is set at d=0.195 microns, and designed for operation in a $2^{nd}$ order of diffraction mode, at a wavelength of 193.3 nm, at approximately 81 degrees incidence angle from the grating surface normal and $T_M$ polarization. An continuous non-reflecting dielectric adjusting layer, 4, is positioned under the grating structure, 5, and optimized with the grating structure so that the device operates in the $2^{nd}$ order to the near exclusion of unwanted orders. In this embodiment, the adjusting layer design parameters include a higher index material relative to the grating structure, 5, namely n approximately 2.0 and a physical thickness of 0.092 microns corresponding, in this instance, to approximately 200% of the ½ wavelength reference layer previously described. In some instances, the adjusting layer physical thickness may approach the ½ wavelength reference without compromising the desired suppression of unwanted orders. Underneath adjusting layer, 4, is a combination of layers comprising a continuous reflecting zone, 3. In this instance, a continuous multilayer, 33, is first provided comprising 20 stack pairs of high and low index pairs of $SiO_2$—$Al_2O_3$ that serve to control the optical mode of the device to reflectance as the mirror portion of the grating device. A greater number of these stacks may be used alone or in combination with a metal layer, as described below, to enhance reflection. It will be appreciated that only one or several pairs of high/low index dielectric pairs may be required. The second portion of the continuous reflecting zone, 3, comprises a continuous metal, 32, to decrease the number of overlying stacks, 33, and, if need be, to widen the spectral coverage. In general, the more stacks, 33, that are used, the narrower the spectral coverage. An optional substrate, 1, underlies the continuous metal layer, 32. In this embodiment in which the reflection multilayer structure comprises stacks, 33, and metal, 32, the grating is designed to operate at 193 nm, an excimer laser wavelength.

Figure 2:
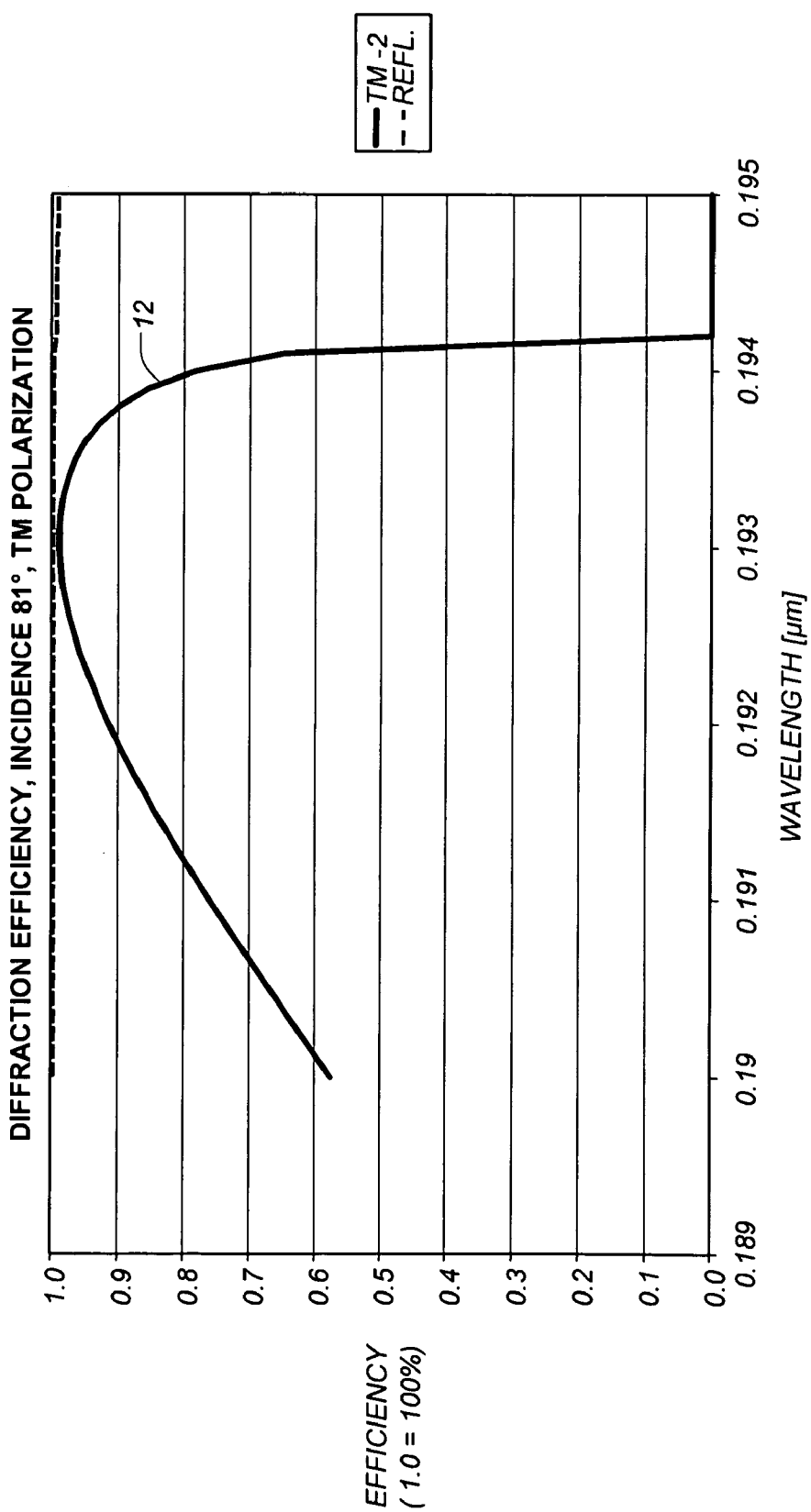
FIG. 2 shows the single order diffraction efficiency of the embodiment in FIG. 1 versus wavelength at an angle of incidence of 81 degrees.

FIG. 2 illustrates the performance of an embodiment of FIG. 1, where there is no metal reflecting layer, 32. 20 stack pairs of dielectric high/low index stacks, 33, are employed together with the overlying adjusting layer 4 and grating structure 5 to give nearly 100% $2^{nd}$ order diffraction efficiency, 12, at an excimer laser wavelength of 193.3 nm at an angle of incidence of 81 degrees. By suitable alteration, other designs with similar performance at 248 nm excimer laser wavelengths can be provided.

Figure 3:
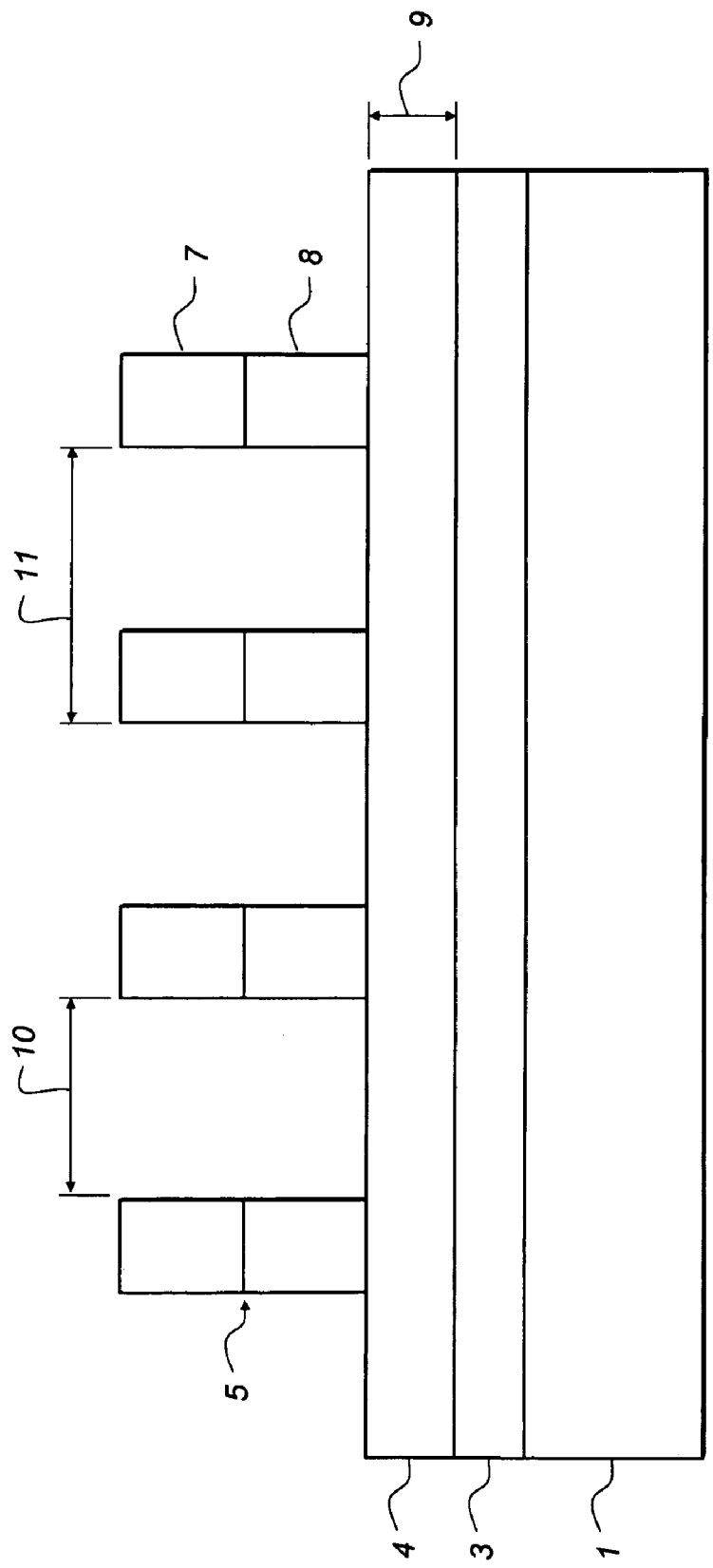
FIG. 3 shows an embodiment in which the grating structure comprises dual layers within the dielectric grooves on top of an adjusting layer on top of a metal reflection layer.

FIG. 3 is illustrative of an embodiment that has a dual layered, or stacked, dielectric grooved grating structure, 5, having an upper portion, 7, and a lower portion, 8, with a periodic groove structure depicted by separation, 11. The width of the well between each individual groove stack is 10 and is determined by the particular design requirement of the diffractive system. As part of the design, dielectric material is placed as a continuous dielectric adjusting layer, 4, between the metallic reflection layer, 3 and grating structure, 5. The adjusting layer, 4, is optimized along with the grating structure, 5, to achieve suppression of all orders of diffraction, including but not limited to the $0^{th}$ order, except a chosen order. In the case of telecommunication devices, energy is expected to concentrate into the $1^{st}$ order but other orders will be suppressed, while in excimer laser applications, the $3^{rd}$ order will prevail to the near exclusion of other orders. Substrate 1, although optional, is provided in these examples to support the grating structure 5, the adjusting layer 4 and the metal reflecting layer 3.

A first order device of FIG. 3, (Device A) comprises the following parameters.

TABLE 1

| DEVICE A | | Dimensions | Material |
|---|---|---|---|
| Grating Structure, 5 | | Groove width, 10, = 400 nm<br>Groove period, 11, = 864 nm | |
| | Top Layer, 7 | height = 490 nm | $SiO_2$ |
| | Lower Layer, 8 | height = 210 nm | Si |
| Adjusting layer, 4 | | physical thickness, 9 = 150 nm | $SiO_2$ |
| Reflection layer, 3 | | thickness = 1000 nm | Au or Al |
| Substrate, 1 (optional) | | Fused silicon or silicon wafer | |

Figure 4:
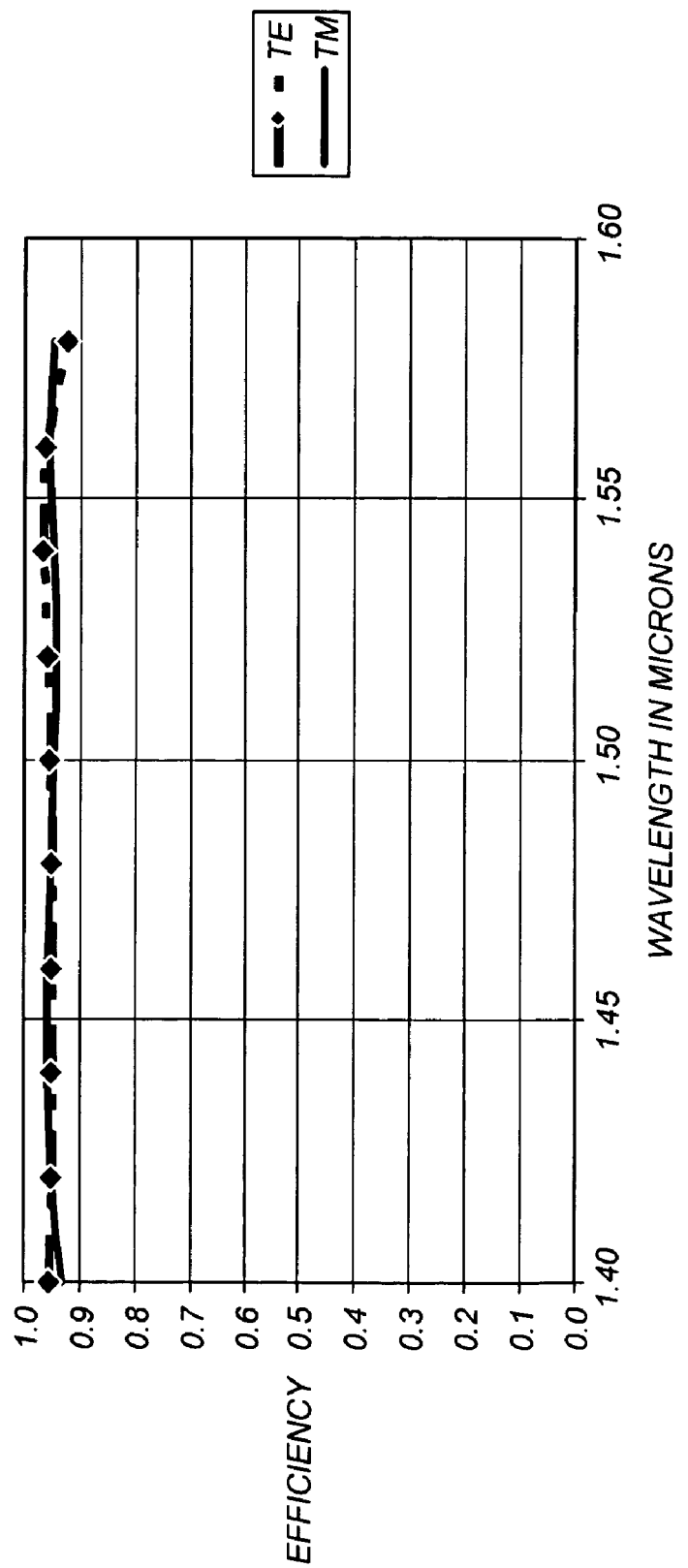
FIG. 4 shows the single order diffraction efficiency and PDL of a $1^{st}$ order grating device of FIG. 3.

FIG. 4 illustrates the diffraction efficiency of Device B which is designed for telecommunication wavelengths of about 1500 nm operating in the $1^{st}$ order. The diffraction efficiency for $T_E$ and $T_M$ polarization is shown over the entire bandwidth of FIG. 3. As noted previously, the $SiO_2$ adjusting layer, 4, is optimized along with the grating structure to suppress all but the $1^{st}$ order, and in this instance is 150 nm in physical thickness, 9, or approximately 52% of the physical thickness of a the ½ wavelength reference layer. Adjusting layer, 3, is in contact with a metal reflecting layer, 2, in this instance copper, but may also be aluminum, gold, silver, or other such metals that give high reflection performance at or near this telecommunication wavelength. Substrate, 1, gives rigidity to the layers and may be a glass-like material, such as fused silica or silicon wafer as illustrated, or any material that has mechanical properties required for the particular use. The diffraction efficiency performance in the first order, in both planes of polarization, illustrated in FIG. 4 is indicative of these first order grating devices. Notably, the efficiency exceeds about 95% over a broad incident wavelength range. As well, PDL is near zero over the same wavelength range. However, this type of device, utilizing suitable materials, can be utilized for excimer lasers operating at 193 nm and 248 nm.

Figure 5:
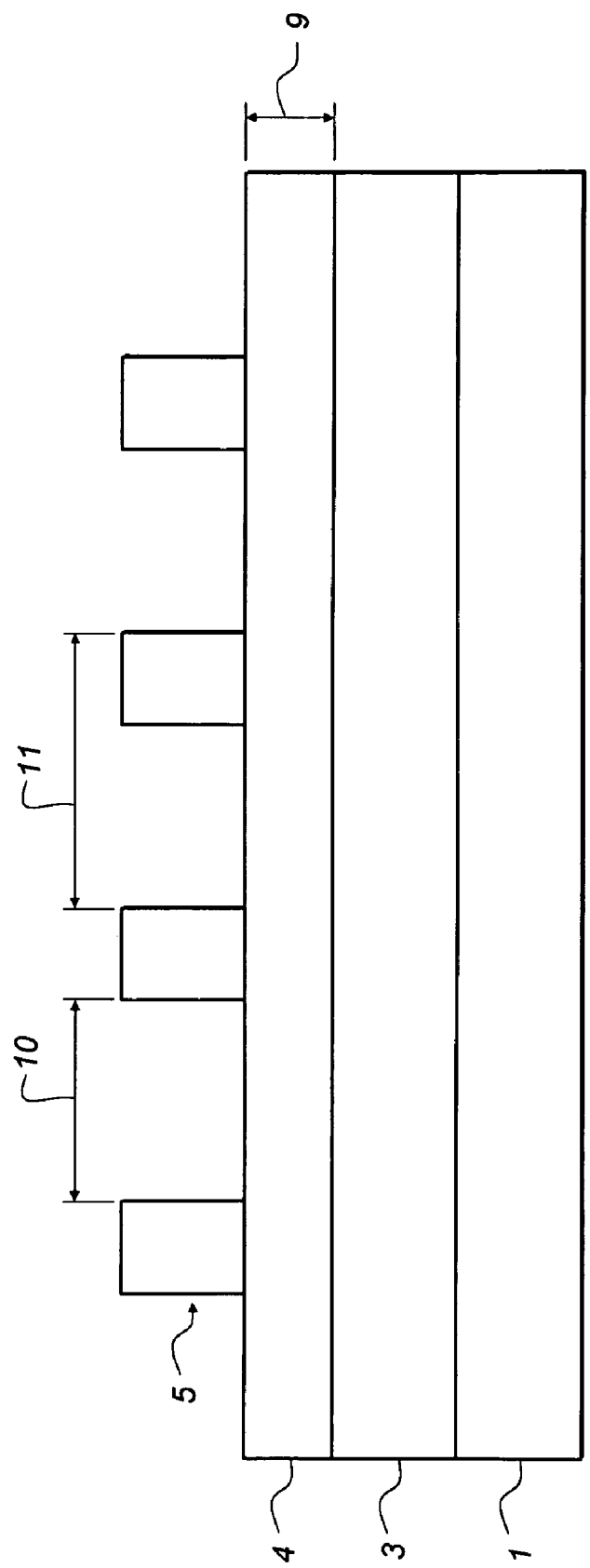
FIG. 5 shows an embodiment in which the grating structure comprises a single dielectric grating structure on top of a continuous dielectric adjusting layer on top of a metal layer as the reflection layer followed by a support.

In FIG. 5 an embodiment is illustrated for a diffraction grating device that utilizes a single layered grating structure, 5, etched on top of a continuous non-reflecting dielectric adjusting layer, 4. Layer 4 comprises a dielectric material. The parameters of the grating structure, 5, and the adjusting layer, 4, can be optimized to achieve maximum order suppression effects in a single order of interest to the near exclusion of other unwanted orders. The grating layer 5, and continuous adjusting layer, 4, in that sequence, are positioned over a continuous metal reflection layer, 3. The metal can be aluminum in the case of (a) 193 nm or 248 nm excimer laser devices and (b) telecommunication devices operating at 1.5 micron wavelength. The metal can be gold, silver, or copper if used at 1.5 microns. In the case of excimer laser wavelengths, the grating structure, 5, and continuous adjusting layer, 4, dielectric materials are each different but may be $SiO_2$, $Al_2O_3$, or fluorides. Typically their respective indices of refraction are significantly dissimilar.

Figure 6:
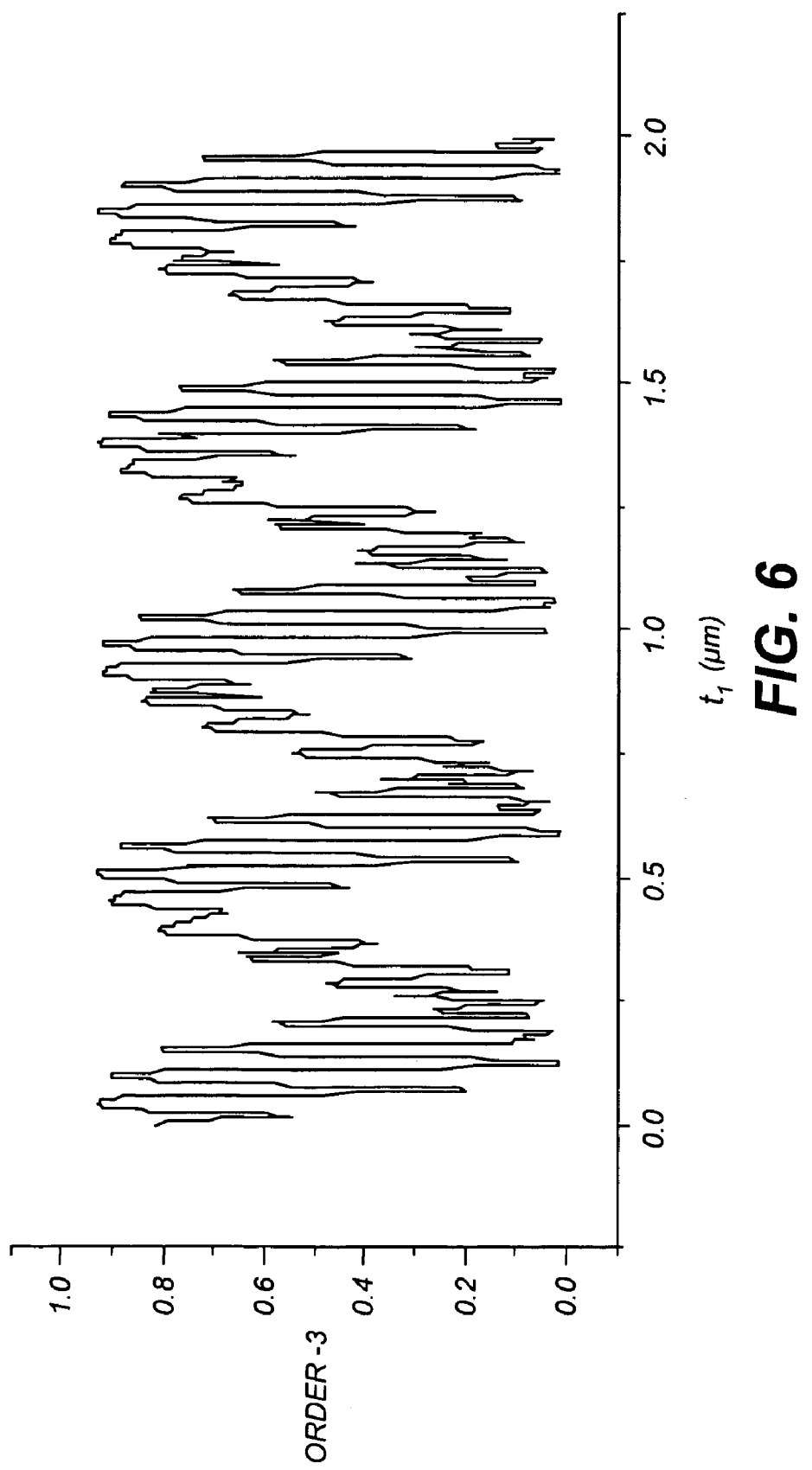
FIGS. 6, 7 and 8 show the $3^{rd}$ order efficiencies of FIG. 3 devices when the thickness of the adjusting layer is varied within three thickness ranges.
Figure 7:
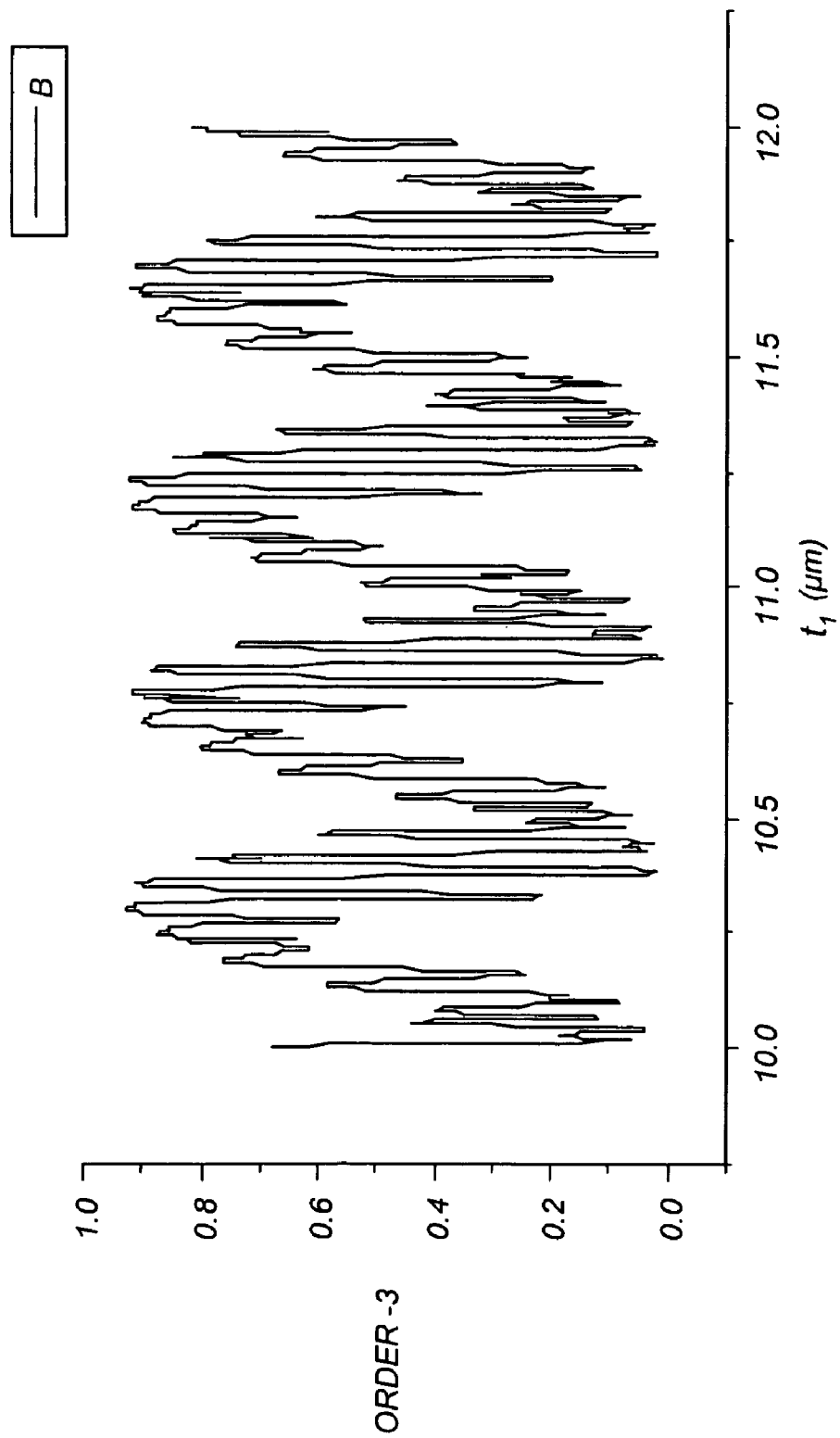
Figure 8:
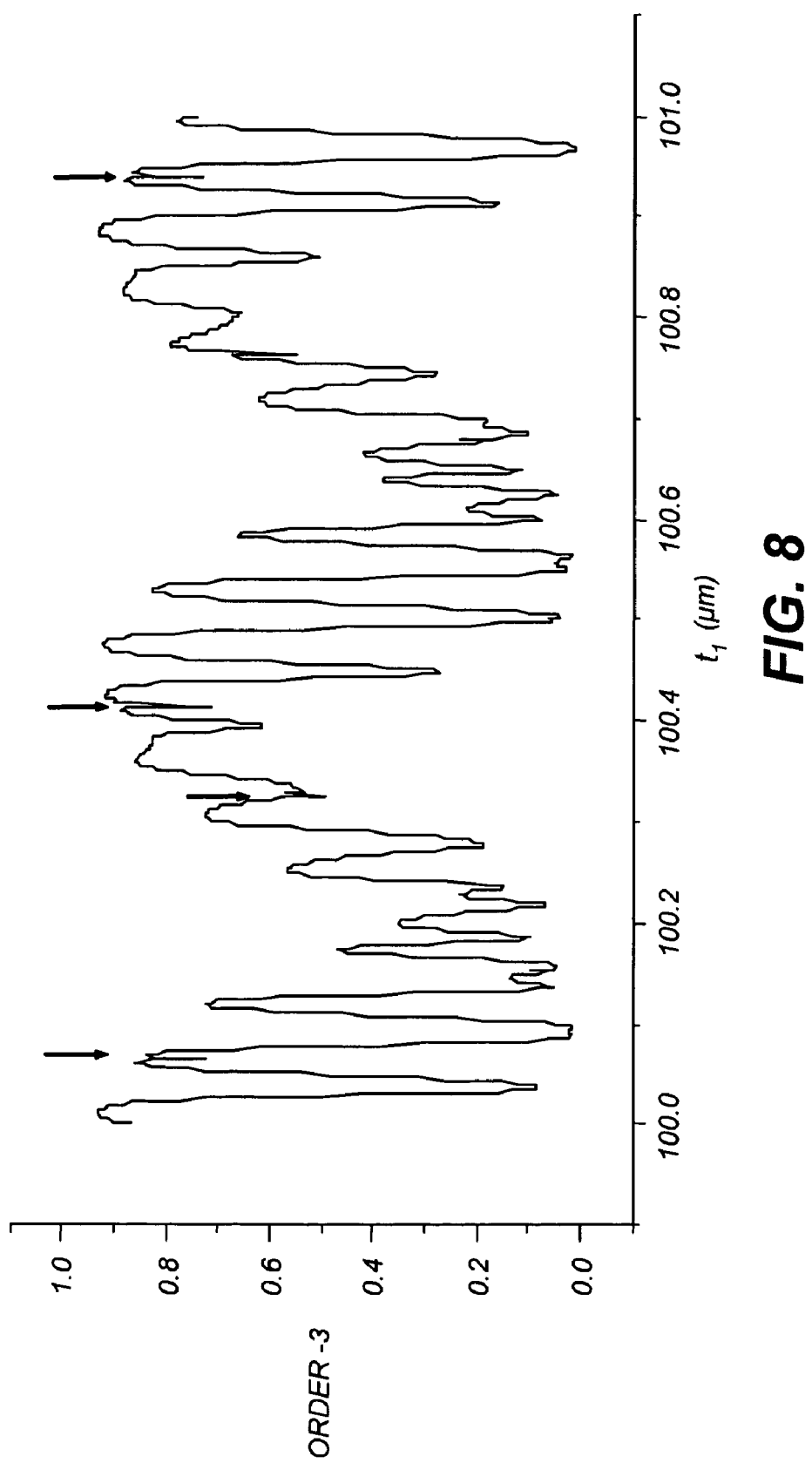

FIGS. 6, 7 and 8 represent $3^{rd}$ order efficiencies of $3^{rd}$ order devices shown in FIG. 3 as a function of the adjusting layer, 4, physical thickness, $t_1$ (9). For illustration purposes since it is not listed in Table 1, these devices are designated Device C. The respective C Devices comprise a continuous aluminum reflection layer, 3, (index 0.119+i 2.074); a continuous $Al_2O_3$ adjusting layer, 4, (index 1.9, thickness $t_1$); and a dielectric grating structure, 5, made of $SiO_2$ (index 1.56, vertical thickness, 8, =40 nm) and $Al_2O_3$ (vertical thickness, 7, =130 μm), groove frequency 3200 grooves/millimeter, groove width, 10, =125 nm, angle of incidence 68.1°, working order −3 at 193.3 nm wavelength.

Figure 9:
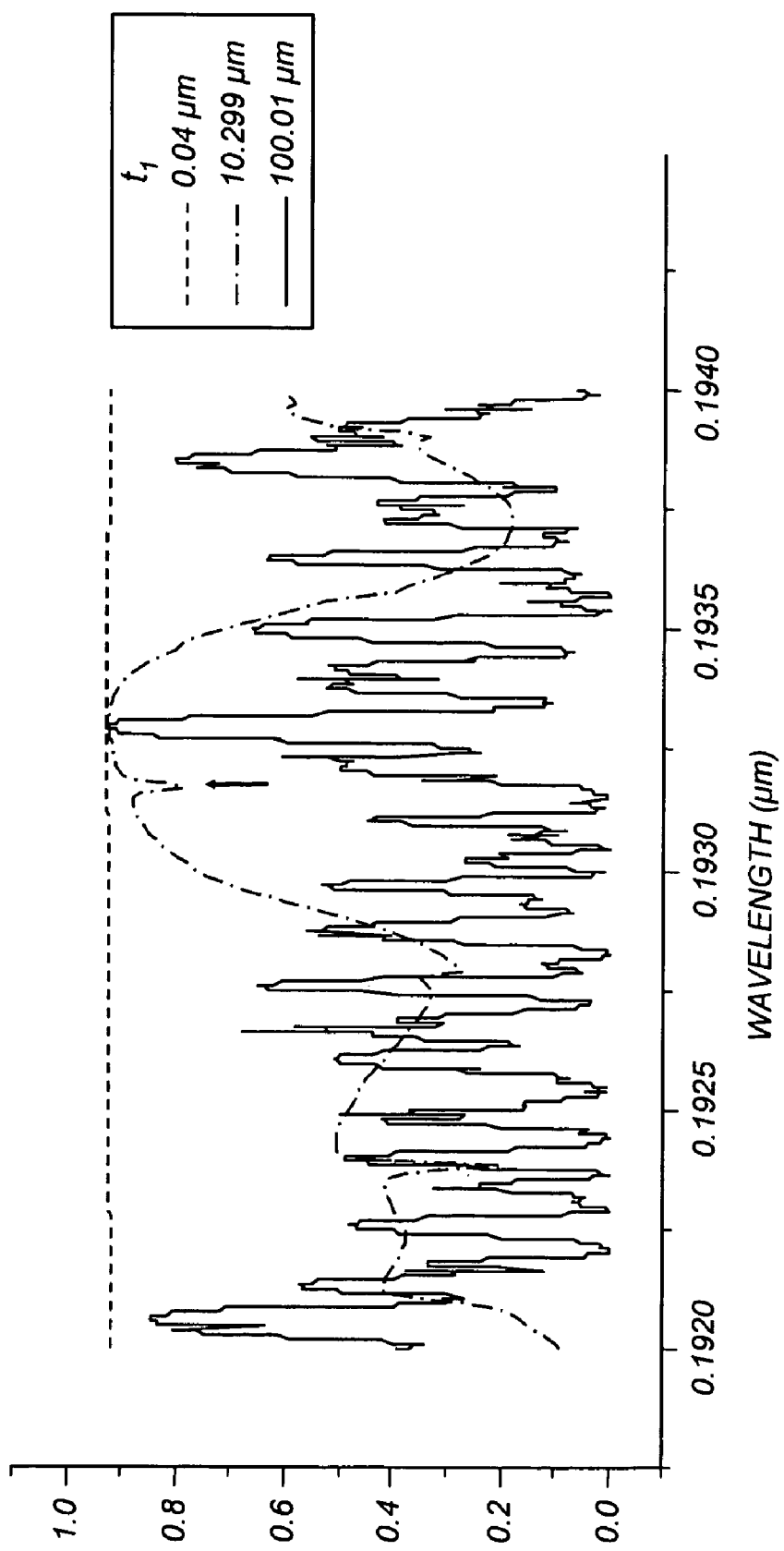
FIG. 9 shows the bandwidth sensitivity of $3^{rd}$ order devices depicted by FIGS. 3, 6, 7 and 8.

FIGS. 6-8 illustrate a periodicity of the Device C properties with respect to the adjusting layer thickness, 9, that is generally independent of the total layer thickness, FIG. 9 summarizes from FIGS. 6, 7 and 8 the spectral dependence of efficiency within each respective adjusting layer thickness, 9, ranges selected for Device C corresponding to the position of three maxima at 193.3 nm in FIGS. 6, 7 and 8. In each instance, unwanted order suppression is achievable for $3^{rd}$ order devices using adjusting layer thicknesses, 9, within each of the specified ranges. Similar predictions should be achievable for other order devices such as telecommunications devices operating in the $1^{st}$ order.

As can be expected seen, with increasing total layer thickness, the maxima in the spectral dependence become narrower, and the optimum values are:

t1=10.299 μm over a range of about 0.0007 μm,
t1=100.01 μm over a range of about 0.000064 μm,
t1=0.04 μm over the entire range depicted.

Figure 10:
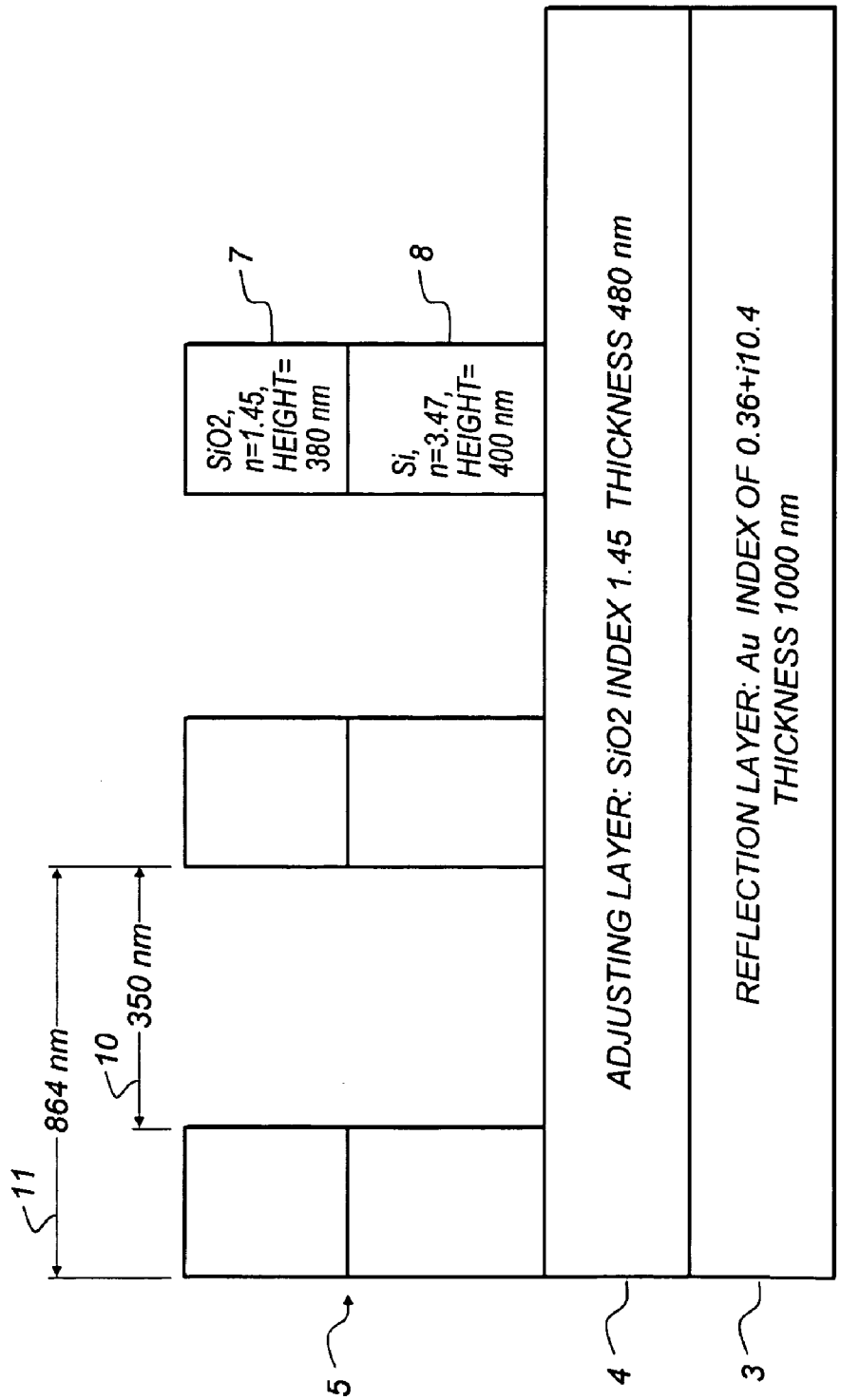
FIG. 10 shows a $1^{st}$ order device embodiment containing an adjusting layer for comparison with the $1^{st}$ order device in FIG. 11 which contains no adjusting layer.
Figure 11:
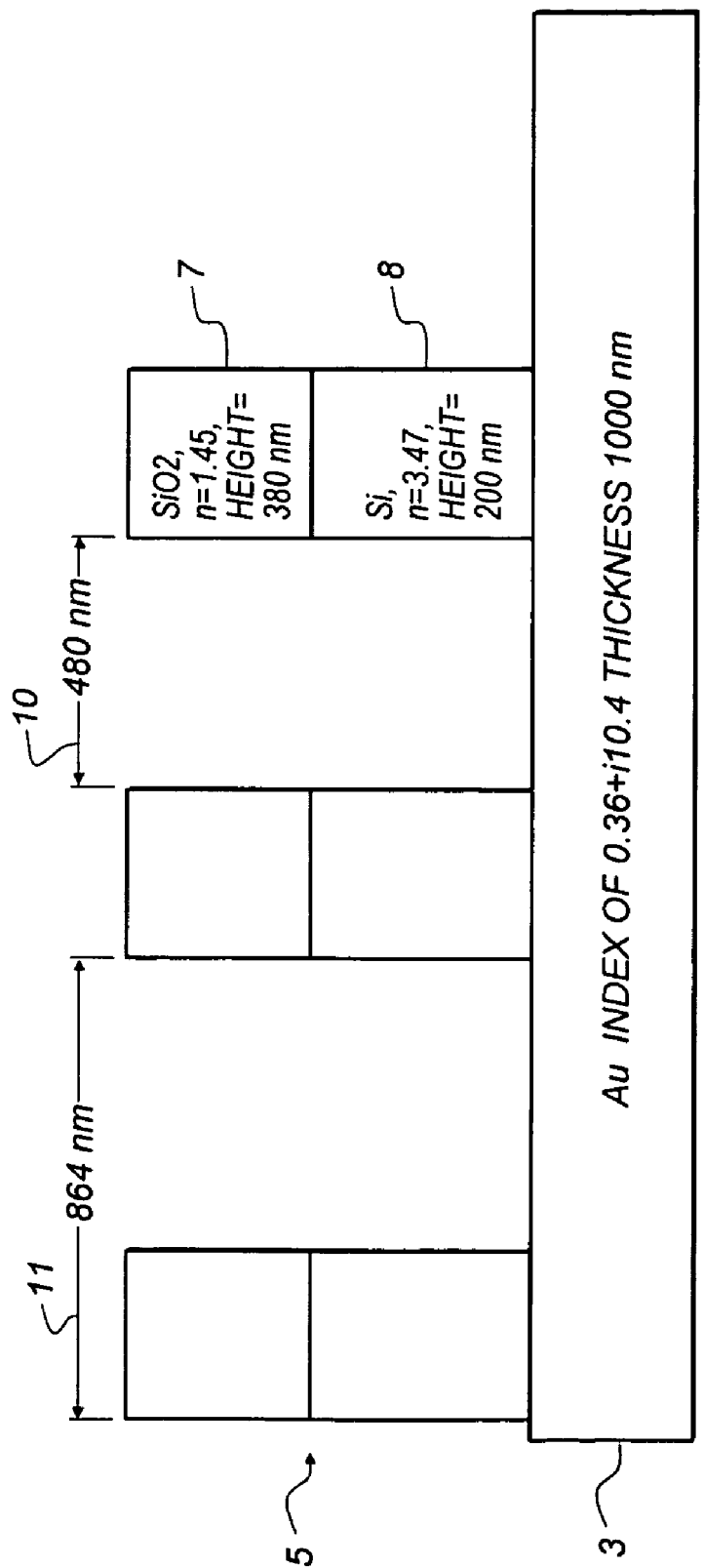
FIG. 11 shows a $1^{st}$ order device that omits an adjusting layer
Figure 12:
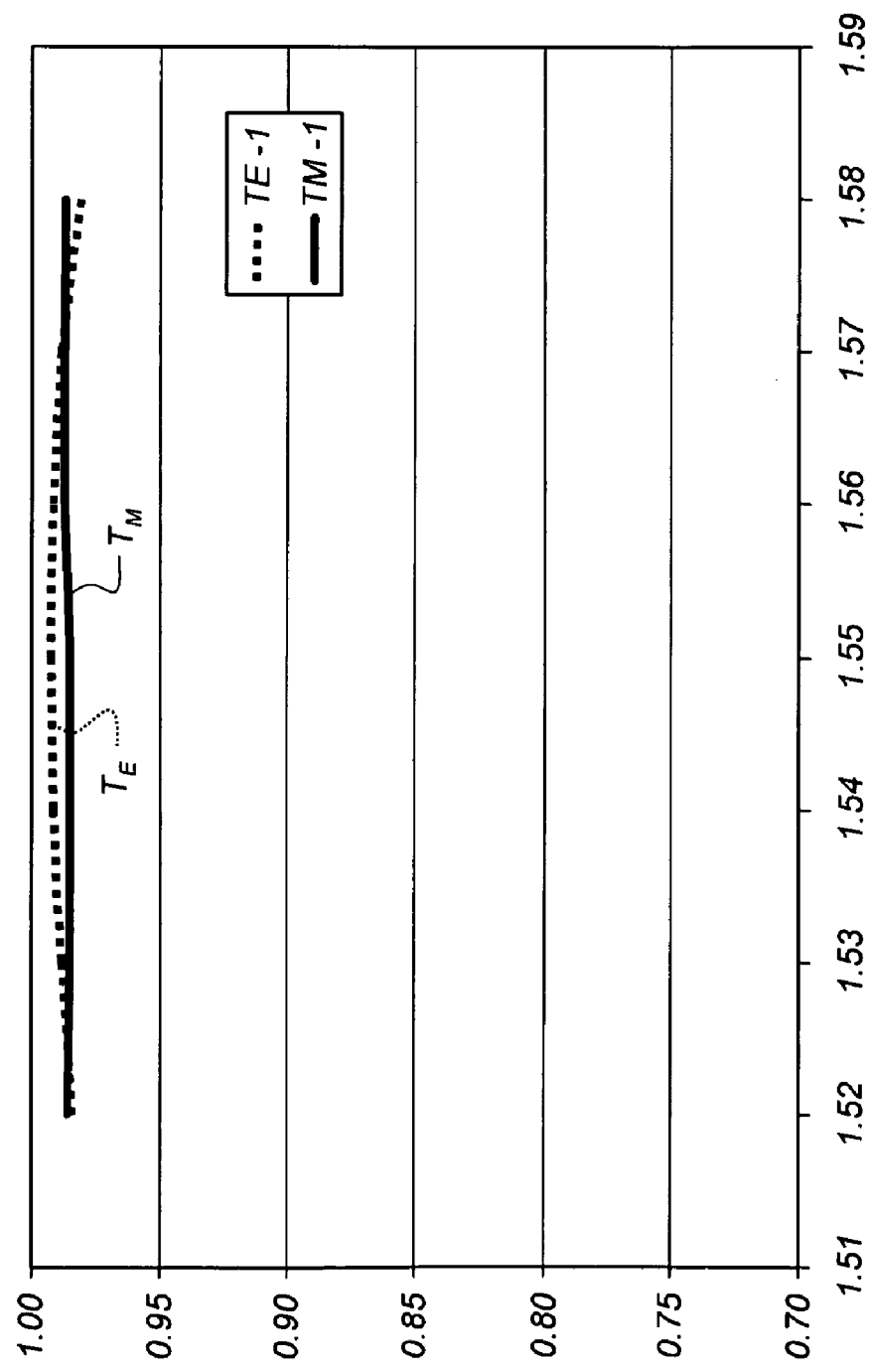
FIG. 12 shows the $T_M$ and $T_E$ efficiencies of the embodiment of FIG. 10 over a telecommunication wavelength range.
Figure 13:
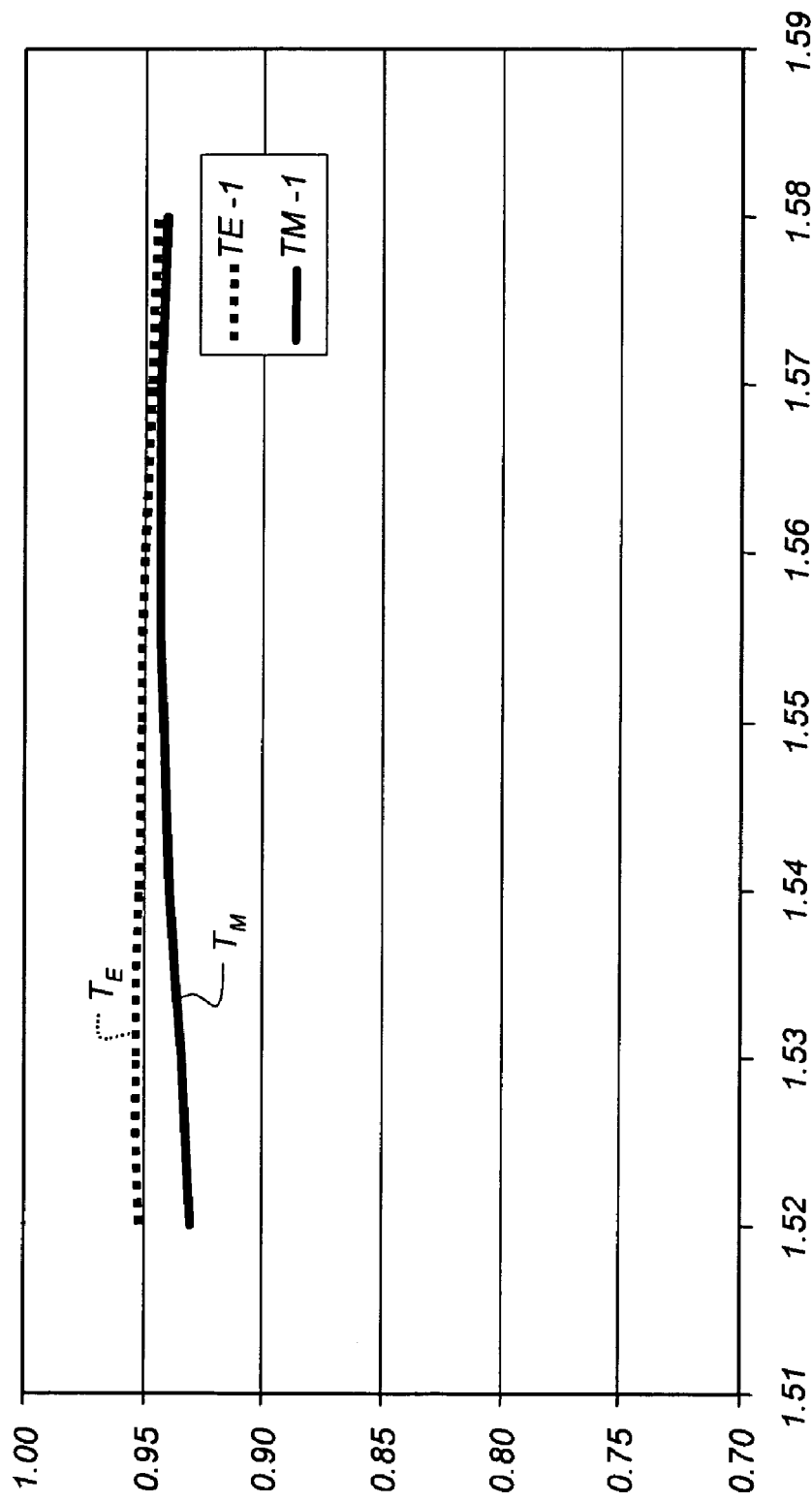
FIG. 13 shows the $T_M$ and $T_E$ efficiencies of the device of FIG. 11 over a telecommunication wavelength range.

FIGS. 10, 11, 12 and 13 represent comparisons of $1^{st}$ order devices with and without the adjusting layers, 4. In FIG. 10, a grating device includes an $SiO_2$ non-reflecting adjusting layer, 4, whereas in FIG. 11, the adjusting layer is omitted, but all other device components remain substantially the same. FIGS. 12 and 13 depict the computed $T_M$ and $T_E$ efficiencies over a telecommunication wavelength range of 1.51 to 1.59 microns.

From the performance data shown in FIGS. 12 and 13 it can be seen that the $1^{st}$ order embodiments of FIG. 10 containing the adjusting layer, 4, achieves efficiencies in excess of 0.98 in both $T_M$ and $T_E$, and low PDL over the entire wavelength range of interest. Device in FIG. 11, without the adjusting layer, on the other hand, suffers approximately 5 to 7 percent energy loss and greater PDL over the wavelength range of interest.

Figure 14:
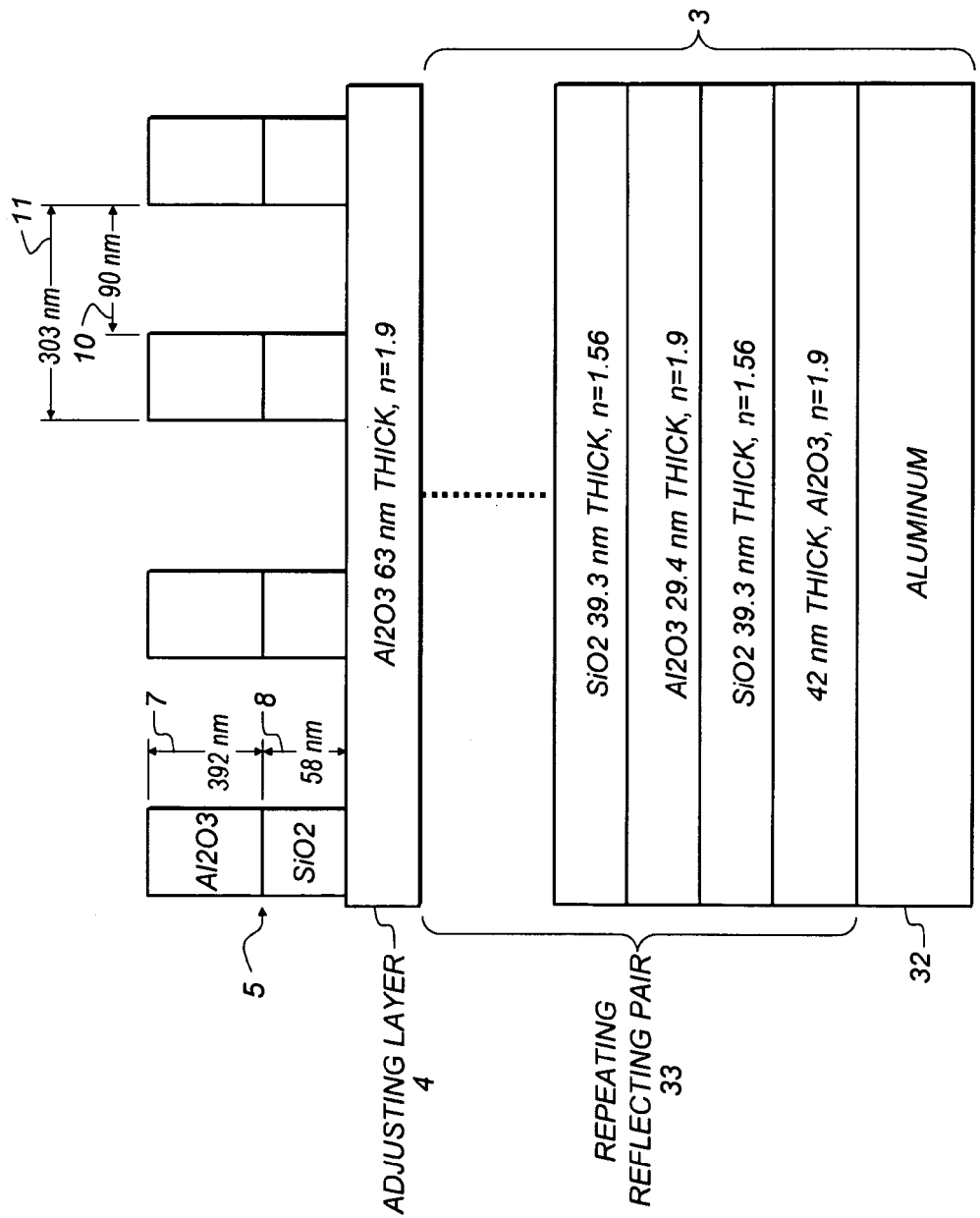
FIG. 14 shows an optimized $3^{rd}$ order embodiment comprising a dual layered dielectric grating structure and a continuous non-reflecting dielectric adjusting layer overlying the reflection stack and Al reflection layer shown in FIG. 15.
Figure 15:
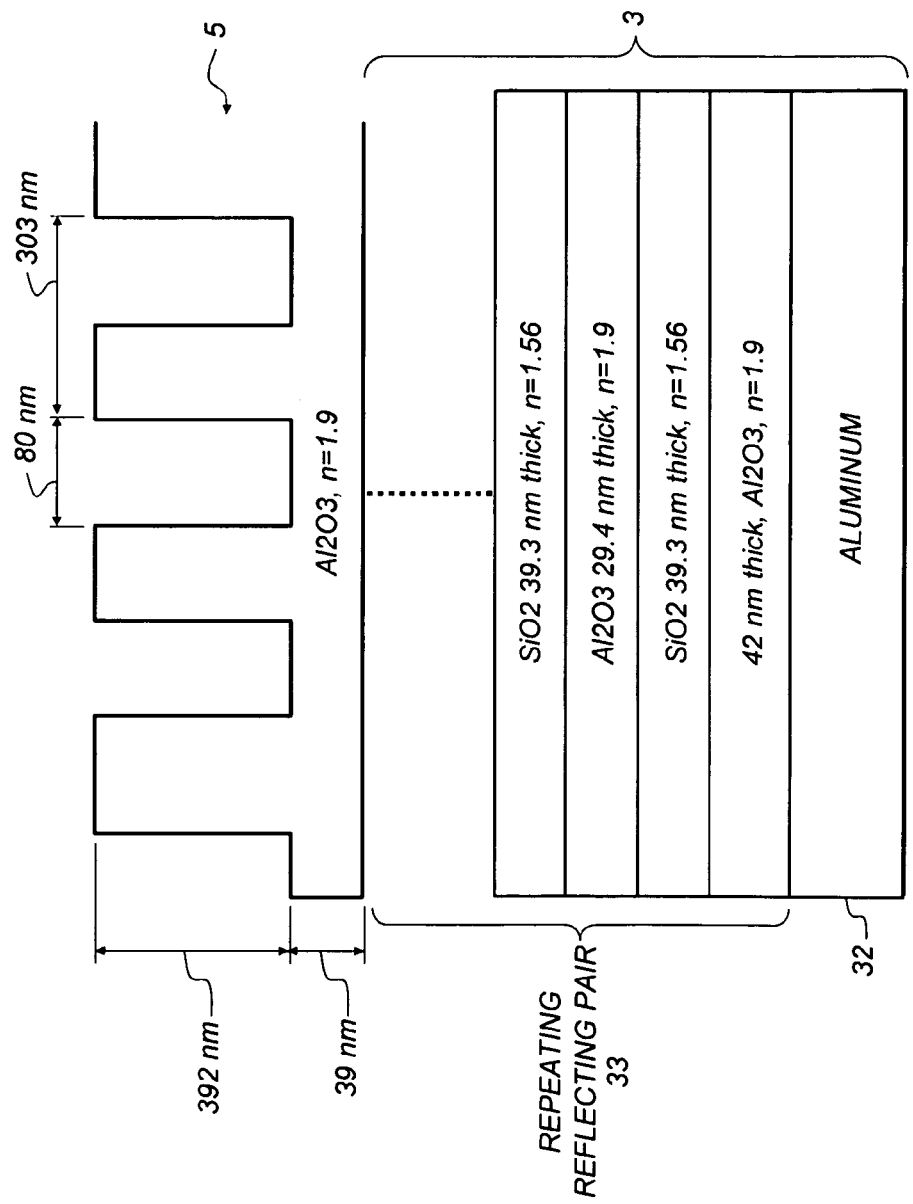
FIG. 15 shows an optimized $3^{rd}$ order reflection grating devices comprising an etched dielectric structure overlaying a multilayer reflection stack further overlying an Al reflection layer.

FIG. 14 and FIG. 15 each represent $3^{rd}$ order reflection grating devices comprising dielectric structures overlaying a multilayer reflection stack, containing 13 stack pairs of dielectric materials, 33 as described in U.S. Pat. No. 5,907,436 (Michael D. Perry et al) further overlying an Al reflection layer, 32. FIG. 14 includes a dual layered dielectric grating structure, 5, and a continuous non-reflecting dielectric adjusting layer, 4 in accordance with the invention, while FIG. 15 provides only an etched dielectric grating layer, 5, as set forth in U.S. '436 without an adjusting layer.

Figure 16:
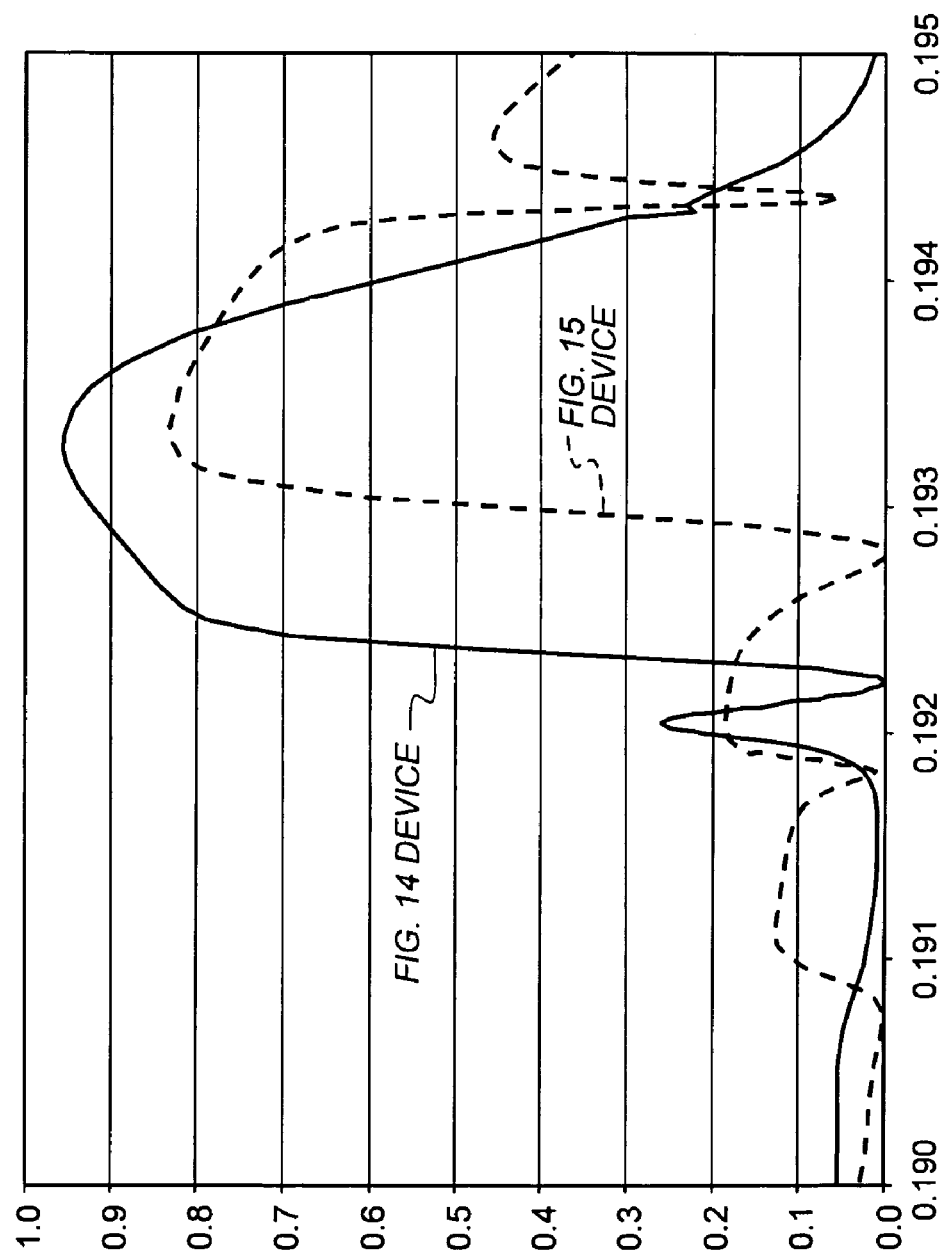
FIG. 16 shows the efficiency in the $3^{rd}$ order of the FIG. 14 and FIG. 15 optimized devices.

Each device was optimized and the efficiency results of the optimization depicted in FIG. 16. It can be seen that that when an adjusting layer, 4, is added, about 95% efficiency in the $3^{rd}$ order is obtained whereas optimization of a grating layer only achieves, at best in this instance, only about 83%.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A reflection grating device comprising, in sequence:
   a. a grating structure for diffracting an incident radiation wavelength in a range from about 1400 nm to about 1550 nm at an angle of incidence normally propagating multiple diffraction orders including a propagated order of interest;
   b. a continuous, non-reflecting dielectric adjusting layer adjacent said grating structure wherein said adjusting layer and said grating structure can be optimized to suppress substantially all but the propagated order of interest, and
   c. one or more continuous reflecting layers adjacent said adjusting layer for reflecting incident radiation,
      wherein the dielectric adjusting layer and grating structure is optimized to suppress all but the $1^{st}$ order as the propagated order of interest.

2. A reflection grating device comprising, in sequence:
   a. a grating structure for diffracting an incident radiation wavelength of either about 193 nm or about 248 nm at an angle of incidence normally propagating multiple diffraction orders including a propagated order of interest;
   b. a continuous, non-reflecting dielectric adjusting layer adjacent said grating structure wherein said adjusting layer and said grating structure can be optimized to suppress substantially all but the propagated order of interest, and
   c. one or more continuous reflecting layers adjacent said adjusting layer for reflecting incident radiation
      wherein the dielectric adjusting layer and grating structure is optimized to suppress all but the $3^{rd}$ order as the propagated order of interest.

3. The grating device as in claims 1 or 2 wherein:
   a. the grating structure comprises grooves having two layers each comprising a dielectric material different from the other;
   b. the reflecting layer or layers comprise a dielectric material, and
   c. the dielectric material of the grating structure, adjusting layer, and reflecting layer each comprises an oxide, nitride, oxinitride or fluoride of an element selected from the group consisting of Group II, Group III and Group IV elements.

4. The grating device as in claim 3 wherein the reflecting layer further comprises a continuous Al, Ag, Cu or Au metal layer in sequence underlying the dielectric reflecting layer or layers.

5. A reflection grating device exhibiting a high efficiency in a propagated order of interest comprising, in sequence:
   a. a grating structure for diffracting an incident radiation wavelength of interest at an angle of incidence normally propagating multiple diffraction orders including the propagated order of interest;
   b. a continuous non-reflecting dielectric adjusting layer, and
   c. one or more continuous reflecting layers adjacent said adjusting layer for reflecting incident radiation,
      wherein the grating structure is designed for operation in the $3^{rd}$ order as the order of interest at a wavelength of interest of about 193 or 248 nm.

6. The reflection grating device of claim 5 wherein said continuous non-reflecting dielectric adjusting layer has a physical thickness substantially unequal to a physical thickness corresponding to a layer having an optical thickness of a ½ wavelength at an index of refraction of the adjusting layer and at the angle of incident radiation.

7. A reflection grating device exhibiting a high efficiency in a propagated order of interest comprising, in sequence:
   a. a grating structure for diffracting an incident radiation wavelength of interest at an angle of incidence normally propagating multiple diffraction orders including the propagated order of interest;
   b. a continuous non-reflecting dielectric adjusting layer, and
   c. one or more continuous reflecting layers adjacent said adjusting layer for reflecting incident radiation,
      wherein the grating structure is designed for operation in the $1^{st}$ order as the order of interest at a wavelength of interest of from about 1400 nm to about 1550 nm.

8. A grating device as in claims 7 or 6 wherein:
   a. the grating structure comprises grooves having two layers each comprising a dielectric material different from the other;
   b. the reflecting layer or layers comprise a dielectric material, and
   c. the dielectric material of the grating structure, adjusting layer and reflecting layer each comprises an oxide, nitride, oxinitride or fluoride of an element selected from the group consisting of Group II, Group III and Group IV elements.

9. A grating device as in claim 8 wherein the reflecting layer further comprises a continuous Al, Ag, Cu or Au metal layer in sequence underlying the dielectric reflecting layer or layers.

10. A grating device as in claim 9 having an efficiency of at least 95% in the order of interest.

11. A grating device as in claim 8 having an efficiency of at least 95% in the order of interest.

* * * * *